(No Model.) 3 Sheets—Sheet 1.

G. B. N. TOWER.
FURNACE FOR BURNING GARBAGE, ROASTING ORES, &c.

No. 293,821. Patented Feb. 19, 1884.

WITNESSES
Fred. G. Dieterich
P. C. Dieterich

INVENTOR
George B. N. Tower
by DeWitt C. Allen Attorney

N. PETERS, Photo-Lithographer, Washington, D. C.

(No Model.) 3 Sheets—Sheet 2.
G. B. N. TOWER.
FURNACE FOR BURNING GARBAGE, ROASTING ORES, &c.
No. 293,821. Patented Feb. 19, 1884.
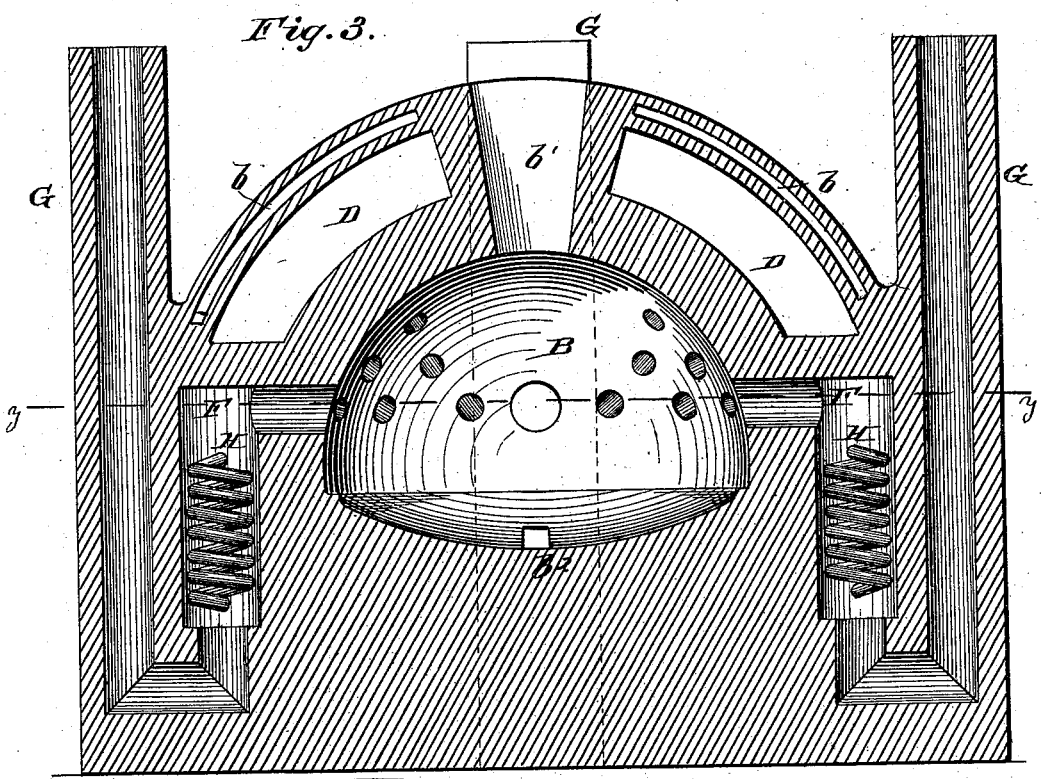
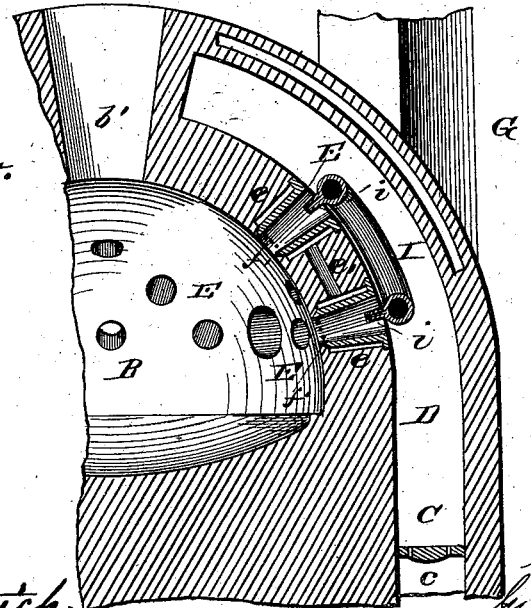
WITNESSES:
INVENTOR.

(No Model.) 3 Sheets—Sheet 3.
G. B. N. TOWER.
FURNACE FOR BURNING GARBAGE, ROASTING ORES, &c.
No. 293,821. Patented Feb. 19, 1884.
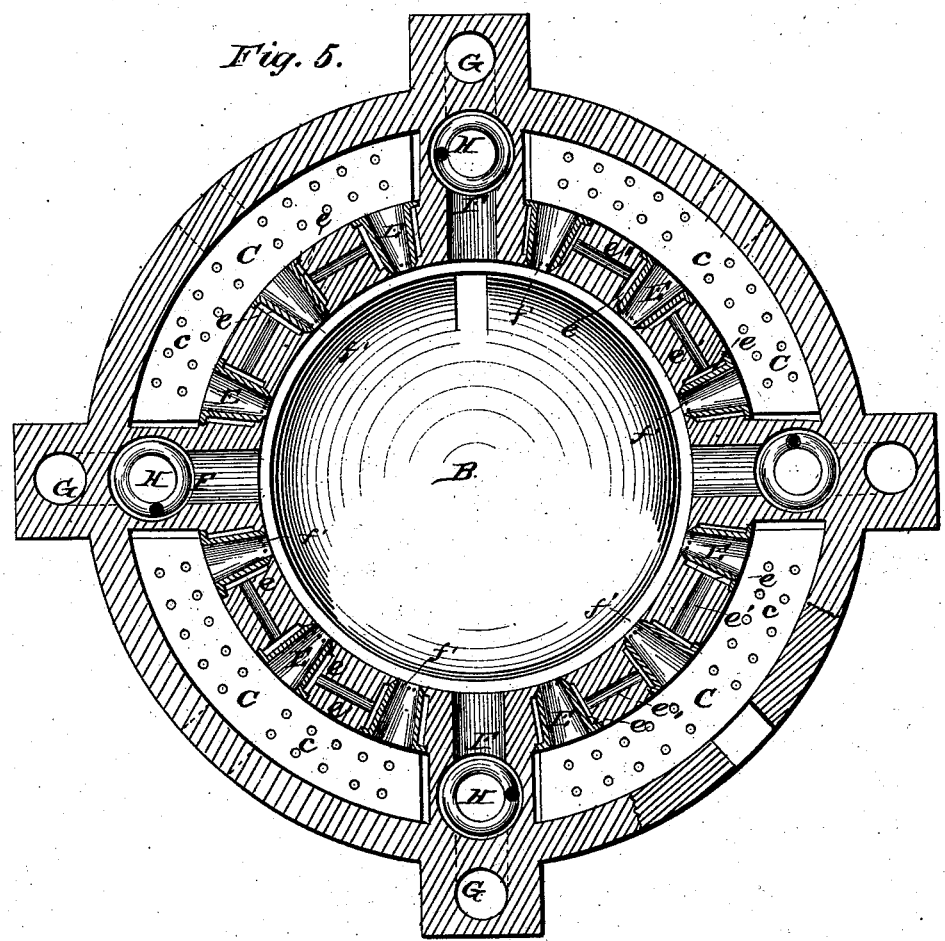
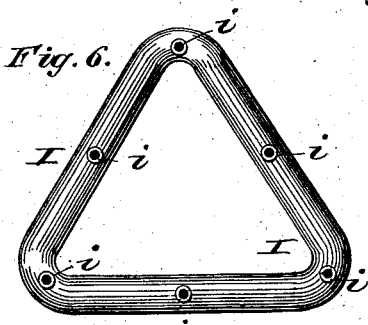
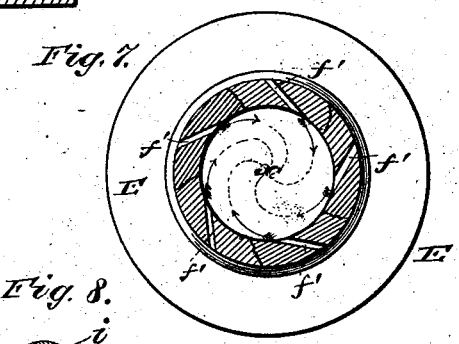
WITNESSES: INVENTOR.

UNITED STATES PATENT OFFICE.

GEORGE B. N. TOWER, OF NEW YORK, N. Y., ASSIGNOR OF ONE-HALF TO EDWARD L. LAMBIE, OF WASHINGTON, DISTRICT OF COLUMBIA.

FURNACE FOR BURNING GARBAGE, ROASTING ORES, &c.

SPECIFICATION forming part of Letters Patent No. 293,821, dated February 19, 1884.

Application filed February 14, 1882. (No model.)

*To all whom it may concern:*

Be it known that I, GEORGE B. N. TOWER, of New York city, in the county of New York and State of New York, have invented certain new and useful Improvements in Garbage-Furnaces; and I do hereby declare that the following is a full, clear, and exact description of the invention, which will enable others skilled in the art to which it appertains to make and use the same.

This invention relates to certain new and useful improvements in reverberatory furnaces, more especially designed for burning garbage, although applicable for the roasting of ores or other similar material; and the object of the invention is to produce a hot blast and intense heat; and to this end the invention consists, essentially, in novel means for producing a hot blast and intense heat from the combined action of a series of jets of combustible gases from the fire-place that are made to commingle with highly-heated air and superheated steam, that are caused to take a whirling or revolving course as they are discharged into the reducing-furnace immediately at the point or points where the heat is greatest, which mixture, igniting, produces a hot blast and intense heat.

The invention further consists in novel features of construction and combination and arrangement of parts in a furnace for obtaining the above-desired results, all as will be hereinafter fully described, and set forth in the claims hereto annexed.

Figure 1:
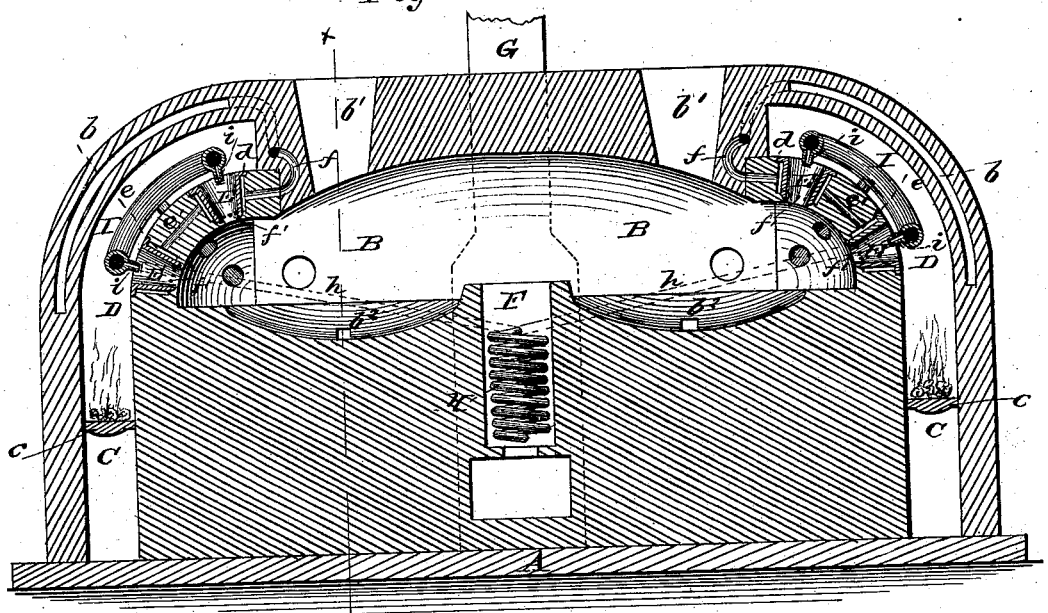
Figure 2:
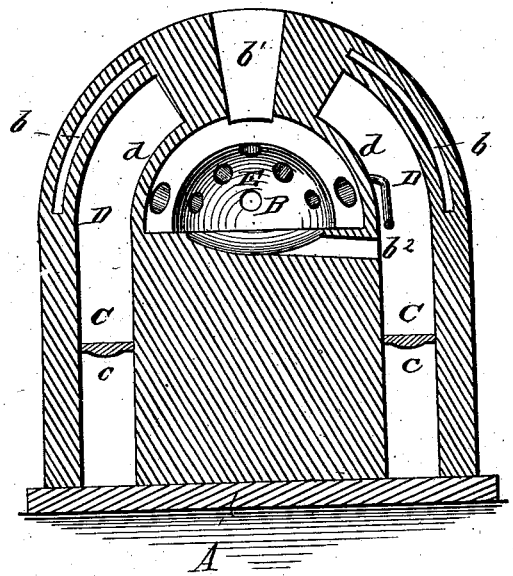

Referring to the accompanying drawings, which form a part of this specification, Figure 1 represents a longitudinal vertical section through my improved furnace; Fig. 2, a transverse vertical section through the line $x\ x$ of Fig. 1; Fig. 3, a vertical section through a modification of my improved furnace; Fig. 4, a partial vertical section of the same; Fig. 5, a horizontal section through the line $y\ y$ of Fig. 3; Figs. 6, 7, and 8, detailed views, to be hereinafter referred to.

Like letters of reference indicate like parts in the several figures of the drawings.

In the drawings, A represents the base upon which my improved furnace is erected.

B represents an oblong or double reducing-chamber, having arranged at the opposite ends thereof segmental fire-boxes C C, having similarly-formed grates $c\ c$ arranged therein; and D D, the combustion-flues of the fire-boxes, extending upward and over the end bridge-walls, $d\ d$, of the reducing-furnace B, and of semicircular and arch-shaped form, as shown in Figs. 1 and 2.

$b\ b$ represent semicircular air-spaces arranged in the walls of the furnace, which correspond to the shape of the flues D D, for a purpose to be hereinafter described.

The reverberatory chamber B, Fig. 1, is provided with openings $b'\ b'$ through the top thereof for charging the furnace, which are to be closed air, or gas tight when the furnace (as shown in Fig. 1, or a single opening, $b'$, when a circular furnace is used, as shown in Fig. 3) is in operation; and $b^2\ b^2$, the usual tap-holes for drawing off any fluid material that may collect in the bottom thereof when the furnace is in operation.

E represents a series of tapering tuyeres extending through the arched or circular-shaped walls $d\ d$ of the furnace, for conducting the hot blast and products of combustion from the fire-places D D to the reducing-chamber; and $e$ are air-spaces formed in said bridge-walls around said tapering tuyeres E, and connected together by pipes $e'$, which air-spaces are to be supplied with cold air in any suitable manner, or hot or highly-heated air by pipes $f$ from the air-spaces $b\ b$, said pipes to be supplied with stop-cocks, plugs, or valves to control or regulate the flow of air through them.

$f'$ represents openings through the tuyeres E, communicating with the air-spaces $e$, said openings being arranged through the tuyeres, around the same, and obliquely to their axes, as shown in Fig. 7, so as to discharge the air in the tuyeres to cause it to take a whirling direction, as shown by the arrows in said figure.

F represents the discharge or combustion flue of the reducing-furnace, arranged centrally therein, as shown in Fig. 1; and G, the uptake or stack shown in dotted lines, and a series of said flues F and uptakes G when a circular dome-shaped furnace is used, as shown in Figs. 3 and 5.

Arranged in the flue F is a coiled pipe, H, supplied with water from any suitable reservoir, by which steam is generated in said pipe from the heat of the products of combustion passing through said flue, and this steam is carried or passed through pipes $h\ h$ to the pipes $I\ I$, arranged in the flues $D\ D$, where it is superheated and discharged directly into the tapering tuyeres E through the jet-pipes $i$. The pipes $I\ I$ are made triangular in form with rounded corners, as shown in Fig. 6, and then curved to conform to the shape of the flues $D\ D$, in which they are located, which form of pipes causes them to retain their shape and not warp or bend by the intense heat they are subjected to. The jet-pipes $i$ are provided at their ends with discharge-roses, having the perforations through them arranged at an inclination, as shown in Fig. 8, so that the jets of superheated steam will be discharged into the flues E obliquely to their axes, thereby causing the steam to take a whirling direction, as shown by the arrows in Fig. 7. The whirling direction the air, steam, and gases are caused to take in passing into and through the tuyeres E intimately mixes them, and the mixture, being ignited as it is discharged into the reducing-chamber from the several flues, continues its revolving or whirling course, as shown by the dotted lines $x$, Fig. 7, from all the flues toward the points indicated by the dotted lines $y\ y$ in Fig. 1, thus producing and discharging onto the material to be destroyed or reduced in the furnace a very strong hot blast and intense heat, that will quickly and effectually reduce, burn, melt up, or destroy any matter subjected to it.

Instead of making the furnace oblong, as shown in Fig. 1, it may be made circular, as shown in Figs. 3 and 5, in which case there would be four fire-boxes C, of segmental shape, with similar-formed grates and flues D, corresponding to the shape of the flues in Fig. 1. There would be four flues F, for the discharge of the products of combustion from the reducing-furnace, and each having an uptake or stack G, and provided with a coiled water-pipe, H, for generating steam, which is carried to the pipes I in the flues D, to be superheated and discharged therefrom into the tapering tuyeres, through the bridge-wall of the furnace, in a similar manner as shown in Figs. 1 and 2.

It will be observed that the circular form of furnace causes all the tapering tuyeres passing through the circular arch-shaped dome to point toward the center of the reducing-furnace and down upon the material to be acted upon, so that the discharge from all of the tapering tuyeres, being the combined action of the products of combustion from the fire-places, the heated air, and superheated steam, as before described, will produce a hot blast and intense heat.

The operation of my improved furnace is obvious. The reducing-furnace having been charged and closed, and fire started in the fire-boxes or furnaces C, the products of combustion will pass upward to the tapering tuyeres E. The air in spaces $b$, becoming heated, passes to the spaces surrounding the tuyeres E, and thence into them, while the steam, being generated in the coiled pipe or pipes H, passes to the pipes $I\ I$, where it is superheated, and also discharged into the flues E, the combined action of the above elements, as before described, producing a strong hot blast and intense heat, that will quickly and effectually do its work, while the superheated-steam jets will aid in producing a powerful draft through the furnace.

I am aware that furnaces having means for discharging air and steam, in connection with combustible gases, into a smelting or reducing chamber are old, and such I do not wish to be understood as claiming, broadly, as of my invention.

I do not wish to be understood as claiming, broadly, in the present case the tapering tuyeres having openings through them arranged obliquely to their axes, for admitting air thereto, as such matter is claimed, broadly, in another application.

I am aware that a tile or casting composed of an inner and outer shell, forming an air-chamber between them, one of which is provided with recesses and the other with corresponding projections to fit therein, the inner shell having oblique apertures, whereby the air and gases are made to take a whirling or revolving course while passing through the flue, was patented to me May 16, 1882, and numbered 257,905, and I do not wish to be understood as claiming, broadly, in the present case anything shown, described, or claimed in said patent.

Having thus fully described my invention, what I claim as new, and desire to secure by Letters Patent, is—

1. The combination, in a reverberatory furnace, of a fire-place and a series of tapering tuyeres built in the walls and communicating with the reducing or smelting chamber, and pipes for conveying superheated steam, arranged therein, and having openings to discharge the steam in said tuyeres obliquely to their axes, whereby the gases from the fire place or places are intimately mixed with said steam, and mixture discharged into the reducing-chamber in a whirling manner, substantially as and for the purpose specified.

2. The tapering tuyere E, having openings through it to discharge air therein obliquely to its axis and the bridge-wall of the furnace, having an air-space surrounding the tuyere, in combination with a pipe arranged therein, and having openings for discharging superheated-steam jets obliquely to the axis of the tuyere, substantially as and for the purpose specified.

3. In a reducing-furnace, the combination, with the tapering tuyeres E, flue or flues D, and flue or flues G, of the coiled water pipe or pipes H, pipe or pipes I, having roses $i$, arranged to discharge in the tuyeres E obliquely to their axes, and connected with the pipe or pipes H, substantially in the manner as and for the purpose specified.

4. The pipe I, for conveying superheated steam, constructed in triangular shape, as shown, in combination with a steam-supply pipe and a series of tuyeres, substantially as and for the purpose described.

In testimony that I claim the foregoing as my own I have hereto affixed my signature in presence of two witnesses.

GEORGE B. N. TOWER.

Witnesses:
FRED G. DIETERICH,
E. L. LAMBIE.